Nov. 25, 1952　　　　　E. TELENIK　　　　　2,619,358
BOBSLED
Filed Feb. 14, 1951
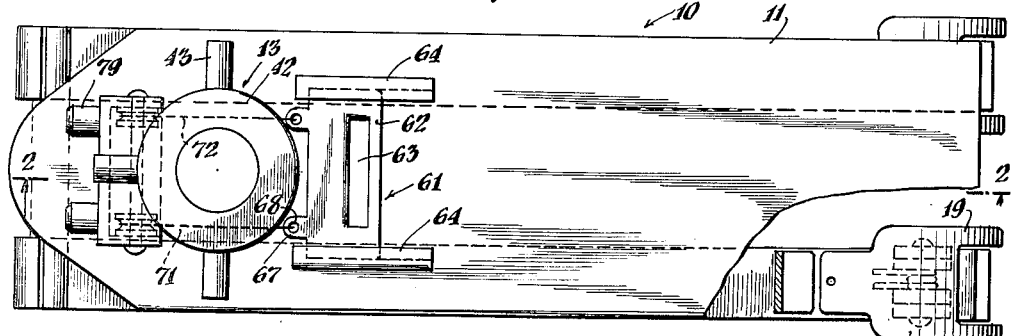
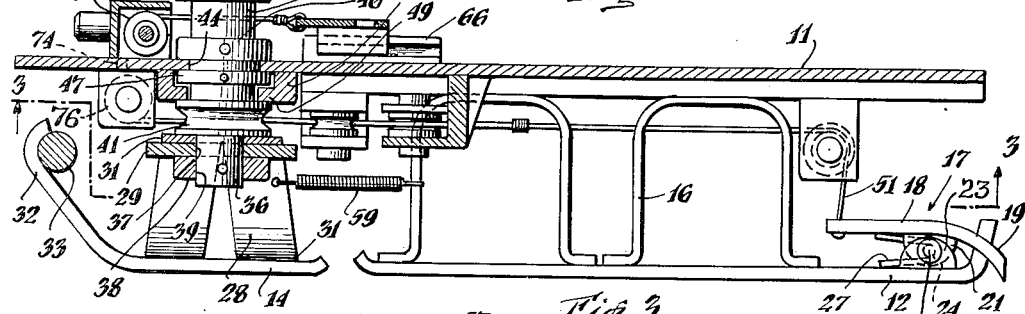
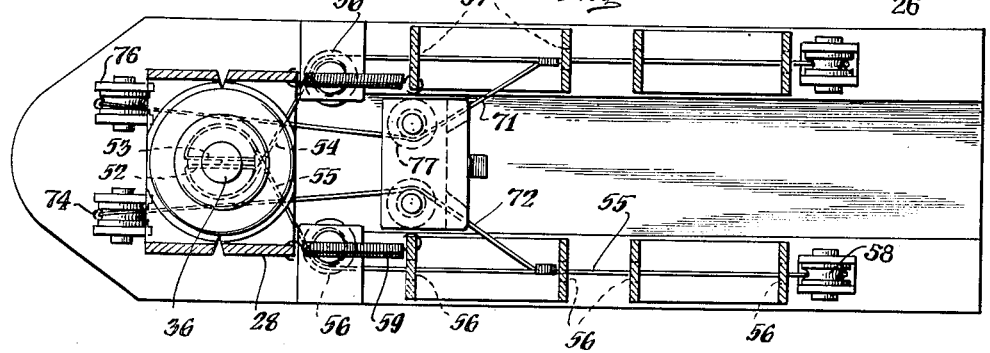
INVENTOR
Eugene Telenik
BY Leo C. Krazinski
ATTORNEY Patented Nov. 25, 1952

2,619,358

UNITED STATES PATENT OFFICE 2,619,358

BOBSLED

Eugene Telenik, New York, N. Y.

Application February 14, 1951, Serial No. 210,837

1 Claim. (Cl. 280—16)

This invention relates to vehicles, particularly to improved bobsleds adapted for passage over ice and snow, and has for its primary object to provide an improved steering and braking mechanism therefor.

While riding bobsleds it is advantageous to be able to turn in one or the other direction quickly and this is accomplished usually by operation of the steering mechanism with foot manipulation, the latter of which might prove hazardous at times. It is, therefore, another object of the invention to accomplish the above by mechanical means entirely and thereby avoid harm to the person steering the bobsled.

With the above objects in view, one embodiment of the invention discloses a bobsled having a pair of rear runners, with pivotally mounted brakes rigidly secured to a top member and a pair of turnable front runners connected to a steering mechanism having a steering member rotatably carried by the top member, the steering member having a rigidly connected pulley around which is coiled a loop portion of a doubled cable, the free ends of which cable are connected to the respective brakes, so that rotation of the pulley in response to the steering member in one direction will actuate only one of the brakes while rotation of the pulley in the opposite direction will actuate the other brake member. A separate manually operated member connected to each brake by individual cables is also provided for actuating both brakes simultaneously.

A more complete understanding of the invention will be obtained from the following description of a preferred embodiment thereof, taken in conjunction with the accompanying drawing in which:

Fig. 1 shows a top plan view of a bobsled of this invention with a portion of the top member broken away to reveal one of the brakes attached to its rear runner;

Fig. 2 is a sectional view taken along line 2—2 of Fig. 1 in the direction of the arrows;

Fig. 3 is a sectional view taken along line 3—3 of Fig. 2 in the direction of the arrows; and Fig. 4 is a top plan view of the steering portion of another embodiment of the invention.

Referring now to the drawing, particularly Figs. 1, 2, and 3, there is shown a bobsled 10 having a top member 11 supported upon a pair of rear runners 12, a steering mechanism 13 at the front portion thereof, and a pair of front runners 14 connected as a unit to the steering mechanism 13.

Each of the rear runners 12 is shown rigidly secured to the underside of the top member 11 by a pair of reversed U shaped, flat straps 16, which may be secured thereto in any suitable manner, as by welding. By use of the U shaped straps a certain amount of resiliency is imparted to the top member, thereby offering more comfort to the rider. Each runner adjacent its rear portion is provided with a pivotally mounted brake 17 comprising an elongated body portion 18 having arcuate, bifurcated ends 19 adapted to penetrate the snow or ice upon rotation thereof, as will be explained hereinafter, a pair of ears 21 having openings (not shown) depending from the body portion 18 adjacent the sides thereof, a pair of similar ears 23 with openings 24 mounted reversely to the ears 21 on the rear runners, and a pin 26 disposed in said openings for affording rotation of said body portion 18. Between each body portion 18 and runner 12 is mounted a resilient member 27, preferably of flat material bent upon itself, as shown, with the ends thereof secured as by welding, respectively to the body portions and runners, the resilient member 27 being biased in such a manner as to draw the front of the body portion 18 towards the rear runner 12 and thereby maintain the bifurcated ends 19 of the brake normally above the surface of the snow or ice.

The front runners 14 are shown rigidly secured by a pair of straps 28 (of substantially the same width as the straps 16 on the rear runners) to a cross member, such as a plate 29 in any suitable manner, as by welding turned over portions 31 thereto. It is to be noted that the front straps 28 are mounted transversely to that shown for the rear straps 16. The front runners 14 are also interconnected at their upturned front ends 32 by a cross rod 33 welded thereto. The front runners 14 are therefore interconnected as a single unit by means of the cross plate 29 and cross rod 33.

To the cross plate 29 is rigidly secured a steering element or post 34 of the steering mechanism 13, which is adapted for manually turning the front runners in the desired direction. One manner of coupling the post 34 to the plate 29, as shown in Fig. 2, is to provide a reduced, squared end portion 36, which registers with and extends through a similarly shaped opening 37 in the plate 29, a locking element 38 with a square opening 39 being pinned to the end portion 36 at the underside of the plate 29. Directly above the plate is shown rigidly secured to the steering post 34 a fgrooved drum or pulley 41, for a purpose that will be described hereinafter. The post 34 is generally round in shape and extends upwardly through the top member 11 and at its uppermost portion is shown rigidly secured to a steering wheel 42, with radial arms 43 projecting therefrom to facilitate manual rotation thereof. An intermediate portion of the steering post 34 is journalled in the top member 11 in any suitable manner, as by using the walls of an opening 44 in the top member 11 as a bearing and providing supplemental bearings above and below the top member comprising bushings 46, 47 pinned to the post 34 and disposed respectively above and below the top member in bearing engagement therewith. A further bearing 48, rigidly secured to the underside of the top member, is also shown for rotatively supporting the bushing 47. The bearing 48, which is U shaped in section with an inwardly projecting portion 49, also serves as a bearing for the upper face of the pulley 41. Thus, it will be readily seen that a sturdy and efficient bearing arrangement is provided for the steering mechanism.

In practicing the invention a connection is provided between the steering mechanism 13 and the brakes 17, which connection is operative in such a manner as to cause actuation of one of the brakes 17 upon rotation of the steering wheel 42. This is accomplished by providing a flexible member, such as a cable 51, which is first doubled upon itself to form a loop and two free ends. The loop portion is affixed to the pulley in any satisfactory manner, as by passing it from the left, as seen in Fig. 3, through registered openings 52, 53 in the pulley 41 and post 34, respectively, and wedging it at the other end of the opening 52; after which the cable ends 54, 55 are separated and wound around the pulley once in opposite directions to further protect the wedge and thereby prevent the cable loop from being accidently withdrawn from the pulley. The cable ends are crossed at the right of the pulley 41, as seen in Fig. 3, and then passed around idler pulleys 56, through openings 57 in the rear straps 16 and thence around idler pulleys 58 to the brakes 17, where the cable ends are rigidly secured to the front ends of the pivotal body portions 18.

The operation of the above mechanism will be readily apparent from Figs. 2 and 3. Assume, for example, that the steering post 34 is to be turned to the left, i. e., clockwise as seen in Fig. 3. Such rotation will wind cable portion 54 around the pulley 41, movement to the left of cable 54 producing a turning movement on the brake body portion 18, whereby the bifurcated ends 19 are thrust into the ice or snow to assist in the turning movement of the bobsled. The other cable portion 55 is slackened but the associated brake 17 remains unaffected and is only rendered operative upon reverse rotation of the steering post 34. Upon release or return of the steering post to its initial position the front runners are automatically retracted by resilient means, such as coiled tension springs 59 coupled between the two adjacent front and rear straps 28 and 16, respectively.

To stop the bobsled on a straightaway course both brakes 17 should be actuated simultaneously. Accordingly, a manually operable member 61 comprising a rectangularly shaped element 62 with a hand opening 63 therein is arranged for reciprocal and slidable movement along the upper surface of the top member, side pieces 64 with overlapping edges 66 being secured to the top 11 for guiding the member 61. At the front edge of the rectangular element is shown a pair of spaced ears or protuberances 67 having openings 68 through which cables 71, 72 are passed and ends thereof secured to the ears 67 in any suitable manner, as by properly sized knots. The cables 71, 72 are passed around idler pulleys 73 mounted at the upper surfaces and adjacent the front portion of the top member 11, after which they are passed through openings 74 in the top member and thence around a second set of idler pulleys 76 mounted at the underside of the top member 11. The cables 71, 72 are then passed about a third set of idler pulleys 77, also mounted, as shown, at the underside of the top member and finally secured to the cables 54 and 55, respectively. It is readily apparent that a direct pull at the hand member 61 will draw cables 71, 72, as well as cables 54, 55 simultaneously towards the left, as viewed in Fig. 3, and in turn actuate at the same time both brakes 17.

In Fig. 4 is shown another embodiment of a steering member 78 adapted to be rigidly secured to steering post 34, the operation of the bobsled being substantially that described hereinbefore.

From the foregoing description, it will be seen that the present invention provides an improved bobsled, particularly the steering and brake mechanism therefor, which can be economically manufactured for use in carrying persons as well as for use as a toy, imitation lamps 79 being provided at the front to accentuate the reality of the toy.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What I claim is:

A bobsled comprising a flat top member, a pair of rear runners, strap members for fixedly securing said runners to said top member, a pair of front runners, a plate between said front runners and said top member, strap members for fixedly securing said front runners to said plate so as to form a front sled unit, means pivotally connecting said front sled unit to said top member, said means comprising a rotatable steering element fixedly secured to said plate, means including a bearing disposed on each side of said top member for journalling said steering element, means at the upper end of said steering element for manually turning the same, a pivotally mounted brake member carried by each of said rear runners, and means including a flexible member interconnecting each of said pivotal brake members and said steering element, said last means being so arranged as to actuate one brake member when the steering element is turned in one direction and to actuate the other brake member when turned in an opposite direction.

EUGENE TELENIK.

REFERENCES CITED

The following references are of record in the file of this patent:

UNITED STATES PATENTS

| Number | Name | Date |
| --- | --- | --- |
| 791,820 | Sattler | June 6, 1905 |
| 1,392,229 | Seifert | Sept. 27, 1921 |
| 1,453,232 | Zukowski | Apr. 24, 1923 |
| 1,453,948 | Pottala | May 1, 1923 |
| 1,883,031 | Smith | Oct. 18, 1932 |

FOREIGN PATENTS

| Number | Country | Date |
| --- | --- | --- |
| 39,676 | Switzerland | Feb. 23, 1907 |
| 74,079 | Switzerland | Jan. 2, 1917 |
| 477,734 | Germany | June 13, 1929 |